(12) United States Patent
Chiang et al.

(10) Patent No.: US 7,226,801 B2
(45) Date of Patent: Jun. 5, 2007

(54) SEALANT REGION PATTERN FOR LIQUID CRYSTAL DISPLAY AND METHOD FOR FABRICATING THE SAME

(75) Inventors: Yi-Chen Chiang, Yijhu Township, Chiayi County (TW); Kuo-Yu Huang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/319,839

(22) Filed: Dec. 28, 2005

(65) Prior Publication Data
US 2006/0160259 A1 Jul. 20, 2006

(30) Foreign Application Priority Data
Jun. 27, 2005 (TW) .............................. 94121405 A

(51) Int. Cl.
H01L 21/00 (2006.01)
H01L 29/04 (2006.01)
(52) U.S. Cl. ............................. 438/30; 438/27; 257/59; 257/72
(58) Field of Classification Search ................. 438/35, 438/30, 25, 26, 27, 116; 257/59, 72
See application file for complete search history.

(56) References Cited
U.S. PATENT DOCUMENTS
6,559,917 B2   5/2003   Ikeno
6,998,221 B2 *  2/2006   Kirmse ......................... 216/51
2005/0178498 A1 * 8/2005   Chen et al. .................. 156/268

FOREIGN PATENT DOCUMENTS
TW   464778   11/2001

OTHER PUBLICATIONS
Taiwan Office Action mailed May 23, 2006.

\* cited by examiner

Primary Examiner—Kevin M. Picardat
(74) Attorney, Agent, or Firm—Thomas, Kayden, Horstemeyer & Risley

(57) ABSTRACT

A sealant region pattern for a liquid crystal display apparatus and a method for fabricating the same. The method comprises providing a first substrate and a second substrate opposite thereto, forming a predetermined material layer on the first substrate, forming an organic material pattern layer having openings of a saw tooth pattern on the predetermined material layer to expose the surface of the predetermined material layer underneath, The surface of the predetermined material layer and the sidewall of the organic material pattern layer form a predetermined angle.

14 Claims, 3 Drawing Sheets

SEALANT REGION PATTERN FOR LIQUID CRYSTAL DISPLAY AND METHOD FOR FABRICATING THE SAME

BACKGROUND

The present invention relates to a display and, more particularly, to a sealant region pattern and fabrication methods thereof.

TFT LCD devices can suffer from degradation related to ambient environmental conditions such as moisture which may lead to performance loss, operational instability, poor color/emission accuracy, and shortened operational life. Specifically, water can cause crystallization and formation of organic solids, electrochemical reactions at the electrode-organic layer interface, corrosion of metals and migration of ionic species. To minimize such degradation, a TFT LCD device must be properly encapsulated to prevent moisture migration. Typical encapsulation methods utilize a color filter substrate covering organic polymer areas with an adhesive sealant.

However, conventional encapsulation methods suffer from problems such as sealant peeling, uneven cell gaps, and formation of voids in the sealant regions during assembly.

An improved method of encapsulating a LCD apparatus is thus called for.

SUMMARY

A method for a sealant region pattern of a liquid crystal display apparatus is disclosed. The methods comprise providing a first substrate and a second substrate opposite thereto, forming a predetermined material layer on the first substrate, forming an organic material pattern layer having a saw tooth opening on the predetermined material layer. The saw tooth opening to expose the surface of the predetermined material layer underneath and the surface of the predetermined material layer and the sidewall of the organic material pattern layer form a predetermined angle.

A sealant region pattern is also disclosed. A saw tooth opening is formed in an organic material layer on a first substrate to expose a predetermined material layer underneath. The surface of the predetermined material layer and the sidewall of the organic material pattern layer form a predetermined angle.

The present invention reduces reliability and integrity problems encountered in conventional methods. Peeling of sealant, uneven cell gaps, and formation of voids in sealant regions during assembly are all reduced.

A detailed description is given in the following embodiments with reference to the accompanying drawings.

DESCRIPTION OF THE DRAWINGS

The present invention can be more fully understood by reading the subsequent detailed description and examples with reference made to the accompanying drawings, wherein.

DETAILED DESCRIPTION

Comparative Example

Figure 1A:
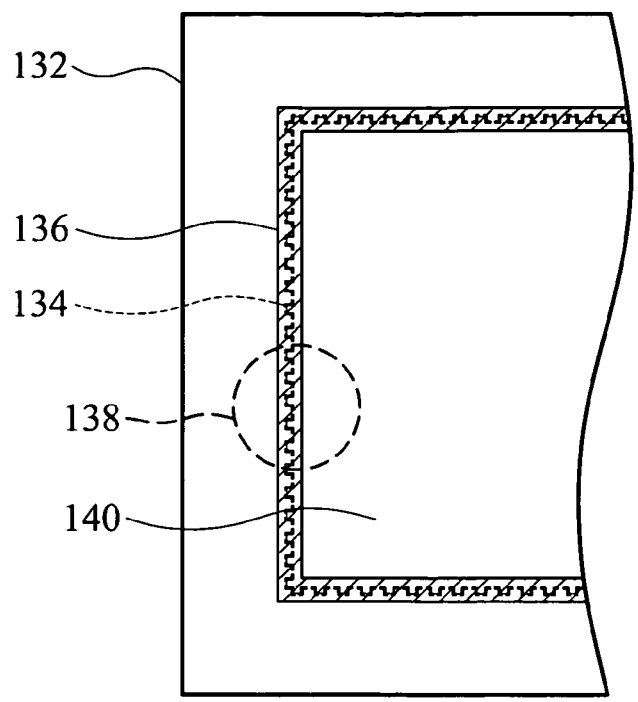
FIG. 1A is a top view of a sealant region for a thin film transistor-liquid crystal display (TFT-LCD) apparatus according to a comparative example.

FIG. 1A is a top view of a sealant region for a thin film transistor-liquid crystal display (TFT-LCD) according to a comparative example. As shown in FIG. 1A, the TFT-LCD apparatus comprises a TFT array substrate 132, saw tooth openings 134, a sealant region 136, and a color filter substrate 140. Sealant 146 shown in FIG. 1C is applied in the openings, forming a sealant region 136 for attachment of the TFT array substrate 132 to the color filter substrate 140.

Figure 1B:
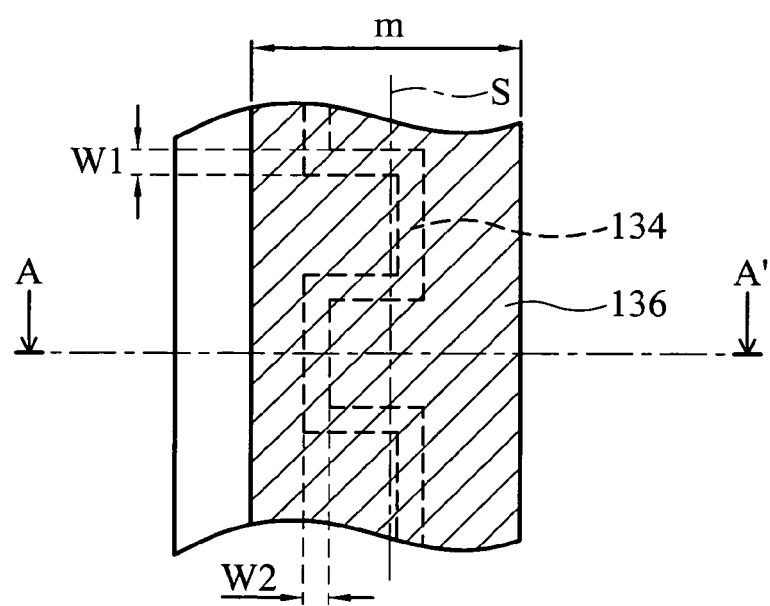
FIG. 1B is a top view of a portion of the sealant region shown in FIG. 1A.

FIG. 1B is a top view of a portion 138 of the sealant region shown in FIG. 1A. The width of sealant region 136 is marked by distance m confined by the two vertical lines. The width w1 of the openings equals width w2 of the openings. The sealant 146 shown in FIG. 1C can be evenly distributed on both sides of a central axis S of the sealant region 136. In other examples, the width w1 may not equal the width w2.

A fabrication method of the described sealant region pattern comprises the following steps.

Figure 1C:
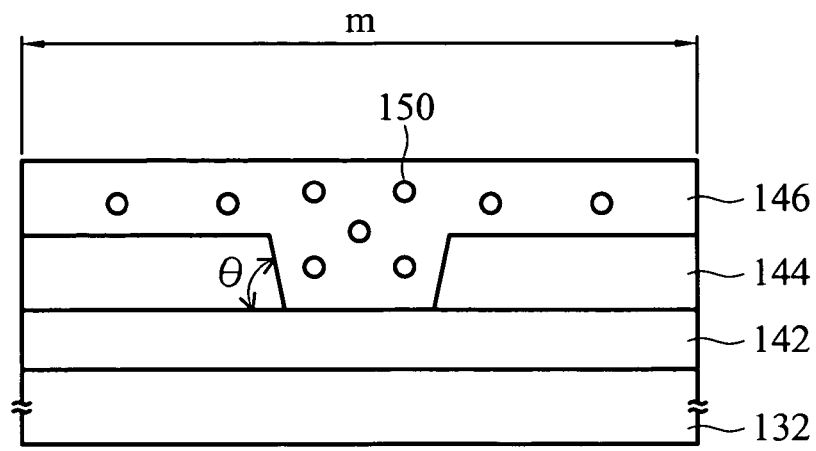
FIG. 1C is a cross-section of the TFT-LCD shown in FIG. 1B along the plane defined by horizontal dotted line AA'.

As shown in FIG. 1C, a TFT array substrate 132 is provided. A predetermined material layer such as a silicon nitride layer 142 is formed on the TFT array substrate 132, serving as a passivation layer.

An organic material layer 144 is formed on the silicon nitride layer 142. The organic material layer 144 is patterned by lithography.

Saw tooth openings 134 shown in FIG. 1B are formed in the organic material layer 144 by etching, and sealant 146 is placed therein.

Voids or bubbles 150 formed during application of the sealant 146 occur due to angle θ between sidewall of saw tooth openings 134 and the surface of silicon nitride layer 142 exceeding 60 degrees.

EMBODIMENT

A method of forming a sealant region pattern for a liquid crystal display is disclosed.

Figure 2A:
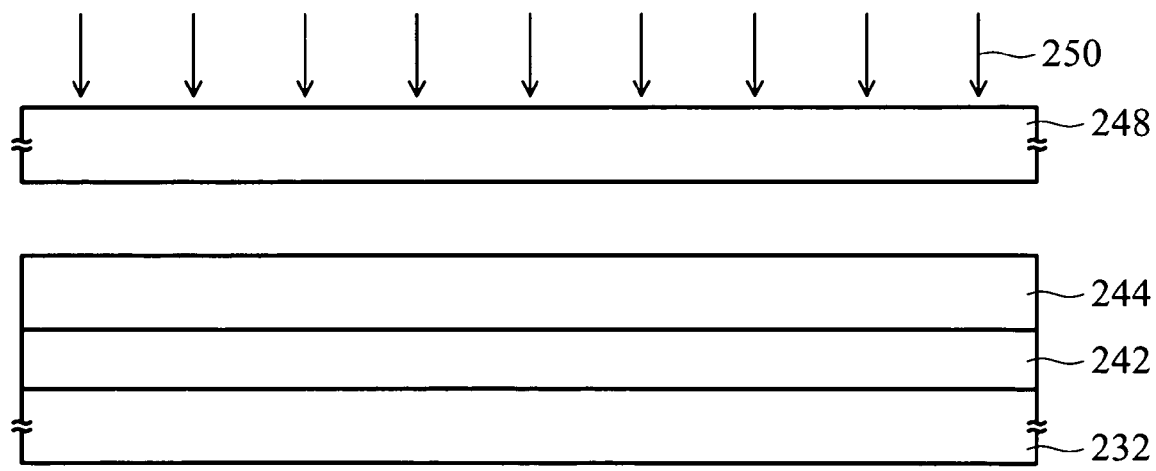
FIGS. 2A to 2C are cross-sections of fabrication of a TFT-LCD according to an embodiment of the present invention.
Figure 2B:
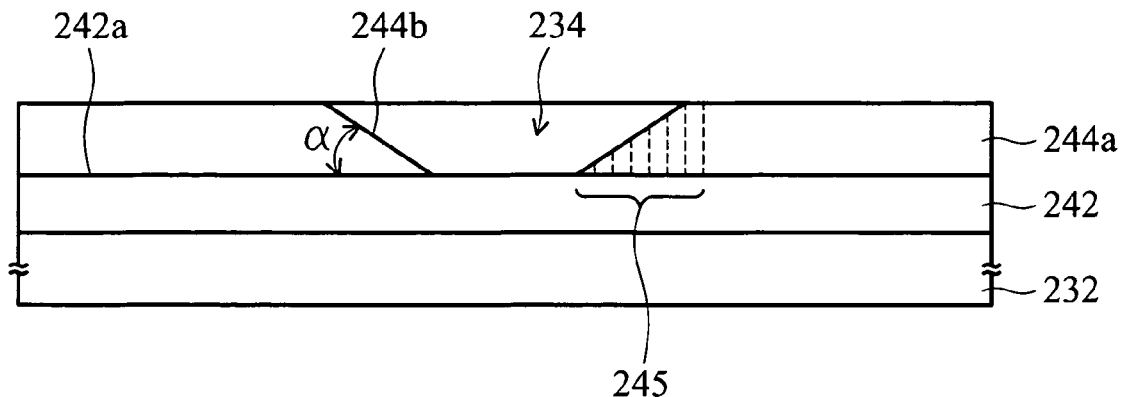
Figure 2C:
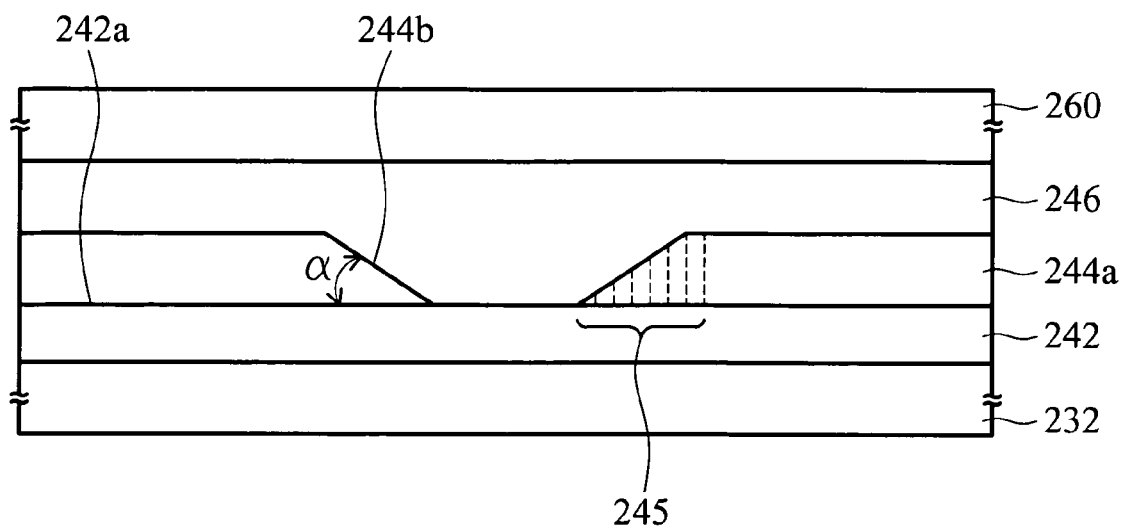

In FIGS. 2A and 2C, a TFT array substrate 232 and a color filter substrate 260 opposite thereto are provided. A predetermined material layer such as a silicon nitride layer 242 is formed on the TFT array substrate 232, serving as a passivation layer. Alternatively, the passivation layer can comprise silicon oxynitride, silicon oxide, organic dielectric layer, or a combination thereof. The predetermined material layer may further comprise Mo, Ti, Al, Ta, metal oxide, metal nitride, or a combination thereof, serving as a metal electrode layer.

An organic material layer 244 is formed on the silicon nitride layer 242. The organic material layer 244 is patterned by lithography, exposed to UV light 250 through a half-tone mask 248 with a predetermined pattern thereon. The predetermined pattern can comprise various openings of different size, providing various local transmittances. Accordingly, the organic material layer 244 is tapered after subsequent development and etching. The organic material layer 244 comprises polymethyl methacrylate (PMMA), photosensitive-methylsilsesquiazane (PS-MSZ), or the like.

In FIG. 2B, saw tooth opening 234 are formed in the organic material layer 244 by etching, similar to saw tooth opening 134 shown in FIG. 1B. The half-tone mask 248 can comprise a gray-tone or slit-pattern mask. Preferably, no etching is performed when using photosensitive low-k organic materials in the organic material layer 244.

An organic material pattern layer 244a is formed on the silicon nitride layer 242 after etching. Portions of the silicon nitride layer 242 are exposed by the saw tooth opening 234 in the organic material pattern layer 244a. Moreover, the sidewall 244b of saw tooth opening 234 and the surface 242a of silicon nitride layer 242 form a predetermined angle α. The organic material pattern layer 244a comprises a plurality of segments 245 adjacent to the saw-tooth opening 234. The thickness of segments 245 increases with distance from the saw tooth opening.

The predetermined angle α is substantially less than 60 degree. In other embodiments, the predetermined angle α ranges from about 20 degree to about 60 degree, or about 50 degree to about 60 degree, or about 10 degree to about 20 degree, or about 30 degree to about 40 degree, or about 40 degree to about 50 degree, preferably about 20 degree to about 30 degree.

In FIG. 2C, a predetermined sealant 246 is placed in the saw tooth opening 234 or in the corresponding position of the saw tooth opening 234 of the TFT-LCD substrate 232 for attaching the color filter substrate 260 with the TFT-LCD substrate 232.

With predetermined angle α, air exhausts easily via the tapered profile of the saw tooth opening 234 during application of sealant, avoiding formation of voids or bubbles in the sealant.

While the present invention has been described by way of example and in terms of preferred embodiment, it is to be understood that the present invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A method for forming a sealant region pattern of a liquid crystal display, comprising:
    providing a first substrate and a second substrate opposite thereto;
    forming a predetermined material layer on the first substrate; and
    forming an organic material pattern layer having a saw tooth opening on the predetermined material layer to expose the surface of the predetermined material layer underneath, wherein the surface of the predetermined material layer and the sidewall of the organic material pattern layer form a predetermined angle.

2. The method of claim 1, wherein the predetermined angle is less than about 60 degree.

3. The method of claim 1, wherein the predetermined angle ranges from about 20 degree to about 30 degree.

4. The method of claim 1, wherein the predetermined material layer comprises a passivation layer.

5. The method of claim 1, wherein the predetermined material layer comprises a metal electrode layer.

6. The method of claim 1, wherein formation of the organic material pattern layer comprises:
    forming an organic material layer on the predetermined material layer; and
    patterning the organic material layer to form the saw tooth opening therein;
    wherein the organic material pattern layer comprises a plurality of segments adjacent to the saw tooth opening, and the respective height of the plurality segments gradually increases with respect to the distance from the saw tooth opening.

7. The method of claim 6, wherein the organic material pattern layer is formed by means of a half-tone mask, a gray-tone mask, or a slit-pattern mask.

8. The method of claim 6, wherein the organic material layer comprises polymethyl methacrylate (PMMA) or photosensitive-methylsilsesquiazane (PS-MSZ).

9. A sealant region pattern for a liquid crystal display, comprising:
    a first substrate and a second substrate opposite thereto;
    a predetermined material layer formed on the first substrate; and
    an organic material pattern layer having a saw tooth opening formed on the predetermined material layer to expose the surface of the predetermined material layer underneath, wherein the surface of the predetermined material layer and the sidewall of the organic material pattern layer form a predetermined angle.

10. The sealant region of claim 9, wherein the predetermined angle is less than about 60 degree.

11. The sealant region of claim 9, wherein the predetermined angle ranges from about 20 degree to about 30 degree.

12. The sealant region of claim 9, wherein the predetermined material layer comprises a passivation layer.

13. The sealant region of claim 9, wherein the predetermined material layer comprises a metal electrode layer.

14. The sealant region of claim 9, wherein the organic material layer comprises polymethyl methacrylate (PMMA) or photosensitive-methylsilsesquiazane (PS-MSZ).

* * * * *